(12) United States Patent
Anderson et al.

(10) Patent No.: US 8,028,924 B2
(45) Date of Patent: Oct. 4, 2011

(54) DEVICE AND METHOD FOR PROVIDING AN INTEGRATED CIRCUIT WITH A UNIQUE IDENTIFICATION

(75) Inventors: Brent A. Anderson, Jericho, VT (US); Andres Bryant, Burlington, VT (US); Alain Loiseau, Williston, VT (US); Anthony K. Stamper, Williston, VT (US); Mickey H. Yu, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/560,031

(22) Filed: Sep. 15, 2009

(65) Prior Publication Data

US 2011/0062240 A1    Mar. 17, 2011

(51) Int. Cl.
*G06K 19/06*    (2006.01)
*G06K 19/00*    (2006.01)

(52) U.S. Cl. .......................... 235/492; 235/487

(58) Field of Classification Search .............. 235/435, 235/439, 451, 487, 492; 340/10, 572
See application file for complete search history.

(56) References Cited

U.S. PATENT DOCUMENTS

| | | | |
|---|---|---|---|
| 3,852,800 A * | 12/1974 | Ohwada et al. ............... | 257/306 |
| 6,161,213 A | 12/2000 | Lofstrom | |
| 6,386,456 B1 | 5/2002 | Chen et al. | |
| 6,600,686 B2 | 7/2003 | Huh et al. | |
| 6,738,788 B1 | 5/2004 | Horng et al. | |
| 6,802,447 B2 | 10/2004 | Horng | |
| 7,193,908 B2 | 3/2007 | Kawasaki et al. | |
| 7,210,634 B2 | 5/2007 | Sapiro | |
| 7,257,504 B2 | 8/2007 | Bolander et al. | |
| 7,442,583 B2 | 10/2008 | Bonaccio et al. | |
| 2005/0183047 A1* | 8/2005 | Sapiro ............................... | 716/4 |
| 2005/0225375 A1 | 10/2005 | Anderson, II et al. | |
| 2006/0085705 A1* | 4/2006 | Schaefer ....................... | 714/718 |
| 2007/0069266 A1 | 3/2007 | Asami | |
| 2007/0085582 A1* | 4/2007 | Brederlow et al. ........... | 327/176 |
| 2007/0090982 A1 | 4/2007 | Sing et al. | |
| 2007/0164775 A1* | 7/2007 | Billingsley et al. ........... | 324/769 |
| 2008/0104551 A1 | 5/2008 | Ouellette et al. | |
| 2008/0232159 A1* | 9/2008 | Aitken et al. .................. | 365/163 |
| 2008/0250361 A1 | 10/2008 | Bae et al. | |

FOREIGN PATENT DOCUMENTS

| | | |
|---|---|---|
| JP | 04072927 | 3/1992 |
| JP | 405102263 | 4/1993 |
| JP | 2002083752 | 3/2002 |
| JP | 02002100191 | 4/2002 |
| JP | 02006253438 | 9/2009 |

OTHER PUBLICATIONS

English Translation of JP 2002-083752 to Mizuno.*
English translation of JP 2002-083752 A, Published Mar. 22, 2002.*

* cited by examiner

*Primary Examiner* — Daniel Hess
*Assistant Examiner* — Matthew Mikels
(74) *Attorney, Agent, or Firm* — Anthony J. Canale; Roberts Mlotkowski Safran & Cole, P.C.

(57) ABSTRACT

A device and method for providing an integrated circuit with a unique identification. The device is usable on an integrated circuit (IC) for generating an identification (ID) identifying the IC and includes a plurality of identification cells each utilizing one of a four wire resistor, thin film resistors, and an inverter pair. A measurement circuit measures a parameter of each cell and is utilized in generating the ID in response thereto.

21 Claims, 9 Drawing Sheets

DEVICE AND METHOD FOR PROVIDING AN INTEGRATED CIRCUIT WITH A UNIQUE IDENTIFICATION

FIELD OF THE INVENTION

The invention generally relates to integrated circuit (IC) or electronic chip (EC) devices and, more particularly, to a device and method usable on an IC or EC for generating an identification (ID) identifying the IC or EC.

BACKGROUND

In order to track chip, wafer, and lot identification (ID), e-fuses (silicided polysilicon PC) or laser-fuses can be blown into each module. Blowing the fuses, however, takes time and adds cost during wafer testing. For example, blowing fuses can take 0.75 s per PS3 cell processor.

It is also known to use random differential Idsat (high drain or saturation current) output of paired MOSFET transistors to generate a unique binary chip ID. In this case, a unique differential Idsat is stored for future reference and for chip identification. Comparator circuitry is typically used to read chip ID. For example, 16×16 arrays of paired MOSFET's are used (256 MOSFET pairs) to uniquely identify a chip running in a "high volume" manufacturing fabrication. Advantages of this technique include the elimination e-fuse or laser fuse blow test time and the possible elimination of tampering with ECID (passports, smartchips, etc.).

This latter technique has disadvantages, however. For example, measuring MOSFET Idsat requires correct biasing of the FET S/D/G and the repeatable application of test voltage, currents, and temperature since the measured differential Idsat will be a function of the test conditions. Another disadvantage relates to how the MOSFET Idsat and other electrical properties change over time due to (a) charge injection into the gate dielectric, (b) radiation (alpha particles, etc.), (c) mobile ions, and (d) wear out of the gate dielectric (trap creation), etc. Another disadvantage relates to how the electro static discharge (ESD) destructive event (blowing the MOSFET gates) can eliminate electronic chip identification (ECID) capability.

Accordingly, there exists a need in the art to overcome the deficiencies and limitations described hereinabove.

SUMMARY

In a first aspect of the invention, there is a device usable on an integrated circuit (IC) for generating an identification (ID) identifying the IC. The device includes a plurality of identification cells each comprising one of a four wire resistor, thin film resistors, and an inverter pair. A measurement circuit can measure a parameter of each of the plurality of identification cells. The device generates or produces the ID using the measured parameters.

In another aspect of the invention, there is a device usable on an integrated circuit (IC) for generating an identification (ID) identifying the IC. The device includes an identification circuit formed on the IC and having a plurality of identification cells, each device having random parametric variations. A measurement circuit is formed on the IC and is utilized to generate or produce the ID based on the random parametric variations of the devices arranged in each cell.

In another aspect of the invention, there is a method of providing an integrated circuit (IC) with an identification (ID). The method includes forming a device for generating the identification on the IC. The device comprises an identification circuit having an array of identification cells each comprising one of a four wire resistor, a pair of resistors, and a pair of inverters, and a measurement circuit utilized in generating or producing the ID based on random parametric variations measured in each cell of the array.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
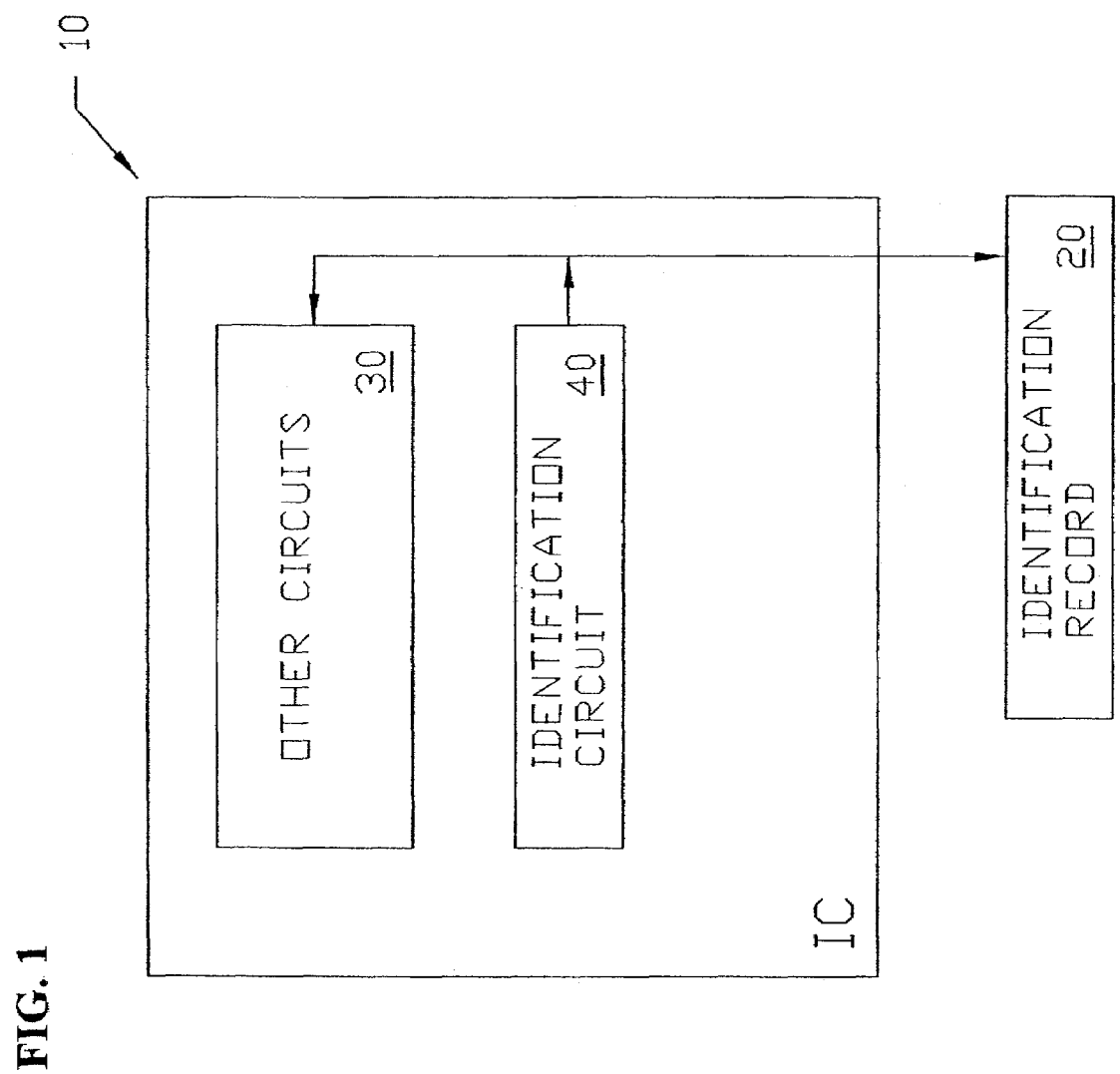
FIG. 1 shows in block diagram form an integrated circuit having arranged therein, among other circuits, a device and/or an identification circuit in accordance with the invention.

The invention generally relates to integrated circuit (IC) or electronic chip (EC) devices and, more particularly, to a device, method, structure, and design structure usable on an IC or EC for generating an identification (ID) identifying the IC or EC. In embodiments, the invention takes advantage of random parametric variation, and more specifically random resistance parametric variation, to create random bits instead of conventional devices such as those which utilize MOSFET Idsat variation. These random bits are used as ECID bits, and are generated by comparing identical structures having natural parametric variation.

Examples of identically formed devices having random parametric variation include: (a) unsilicided or silicided polysilicon PC or diffusion resistors which have values in the range of approximately 10 to approximately 300 ohms/square ($\Omega$/sq); (b) tungsten contacts (PC to M1) or copper vias (Mx to Mx+1) vias having from approximately 1 to approximately 100$\Omega$; (c) copper or aluminum copper (AlCu) wires which have values in the range of approximately 0.01 to approximately 1 $\Omega$/sq.

Instead of a 16×16 array of MOSFET pairs, the invention can utilize a 16×16 array of, e.g., single resistors (whose resistance is directly measured), paired resistors (whose different resistances can be derived), or paired inverters. The array is used to generate an ECID. The ECID can then be read, e.g., either electrically using four point probe measurement or through radio frequency (RF). The invention also recognizes that some of the bits will switch over time (as naturally occurs in such circuit devices, or because of some aging phenomenon). As such, redundancy, statistics, or error correction, can and should be used to determine an ECID match.

In embodiments the invention utilizes an apparatus or device installed on an IC for generating an identification code that can identify the IC or EC. The apparatus or device can include a plurality of identification cells formed from thin film resistors within the IC. Each cell can have an output that contains a substantial amount of variability due to random process variability within the IC. A device for measuring a parameter of each cell can be utilized. The parameter can be in the form of measure and/or derived resistance of the thin film resistors. This is then used to generate a unique identification code for IC, i.e., an ECID.

In embodiments, the invention utilizes an apparatus or device installed on an IC which includes a plurality of identification cells formed from paired thin film resistors, each having an output that contains a substantial amount of variability due to random process variability within said IC and a device for measuring (and optionally storing) the resistance difference between each pair of thin film resistors and using them as a unique identification code for IC. In further embodiments, the invention utilizes an apparatus or device installed on an IC or EC for generating an identification code identifying the IC or EC. The apparatus or device can include a plurality of identification cells formed from inverter pairs. Each cell can have an output, i.e., a zero or "1", that is indicative of a substantial amount of variability due to random process variability within the cell inverters. A device for measuring a parameter, i.e., obtaining the ECID bit output therefore, of each cell is utilized. The output ECID bit can be determined on power-up. This is then used to generate a unique identification code for IC, i.e., an ECID.

FIG. 1 shows an integrated circuit (IC) or electronic chip (EC) 10 which includes, among other things, a plurality of circuits 30 and an identification circuit 40. In embodiments, the identification circuit 40 outputs a unique identification (ID) which identifies the IC 10. The identification circuit 40 is preferably designed as an integral part of the IC 10. In response to control and timing data arriving via control inputs of the identification circuit 40, for example, identification circuit 40 can generate an output data sequence (i.e., an ID) at an IC output terminal (not shown) that uniquely identifies IC chip 10. After fabricating IC chip 10, a manufacturer may record the output ID of circuit 40 in an identification record 20. Thereafter that particular chip 10 can be identified whenever and wherever that chip may be found by the unique ID produced by its ID when control inputs to the circuit 40 signal it to do so.

The ID generated by the circuit 40 is essentially derived from measurements of a set of circuit parameters that naturally vary from chip-to-chip and from circuit element-to-element. Due to natural, random parametric variations, no two ICs are really alike. For example, it is not possible to make two identical devices, i.e., resistors or inverters, even though they are made by similar or identical processes, using similar or identical masks, even in adjacent areas of the same IC die. For example, no two resistors or inverters can be made identical because their dimensions are the result of the random accumulation of photons through the photomask and their depositions or doping levels and distributions are the result of the random distribution of deposition or doping atoms from thermal diffusion and ion implantation. Designers have long been aware of the effect of such random parametric variations on the behavior of such devices and other IC circuit elements and have taken them into account when designing ICs. For example, a good IC design ensures that all copies of an IC behave as expected even though the devices and other circuit elements forming the ICs exhibit a random variation in operating characteristics from element-to-element and from chip-to-chip.

While such random parametric variations have been a problem that IC designers have to overcome, circuit 40 of the present invention makes beneficial use of these variations. In an embodiment of the invention, for example, each circuit 40 includes an array of identically designed cells. Each cell is suitably a simple circuit. One type of cell uses measured current, voltage, or resistance. Another type of cell uses an inverter pair and outputs a bit based on the random variation. Another type of cell uses differences in current, voltage, or resistance whose difference is influenced by random parametric variations affecting the operating characteristics of the resistor or resistors forming the cell. The circuit 40 can, for example, measure the difference between the two output currents of each cell of the array and encode the measurements for all cells into a single output ID that is unique to that particular combination of measurements. When the array is large enough, there is a very low probability that the cell array of the circuit 40 arranged in any one IC chip will produce the same combination of measurements as the circuit 40 arranged in any of millions of other IC chips. Thus an ID generated in such fashion can be used as a unique ID for each chip.

The circuit 40 is advantageous over known chip identification systems because it does not require any custom modification to each individual chip during or after its fabrication in order to make its ID unique. The acquisition and logging of a chip's ID can, for example, be easily and quickly done by an IC tester when it tests the chip's logic.

Figure 2:
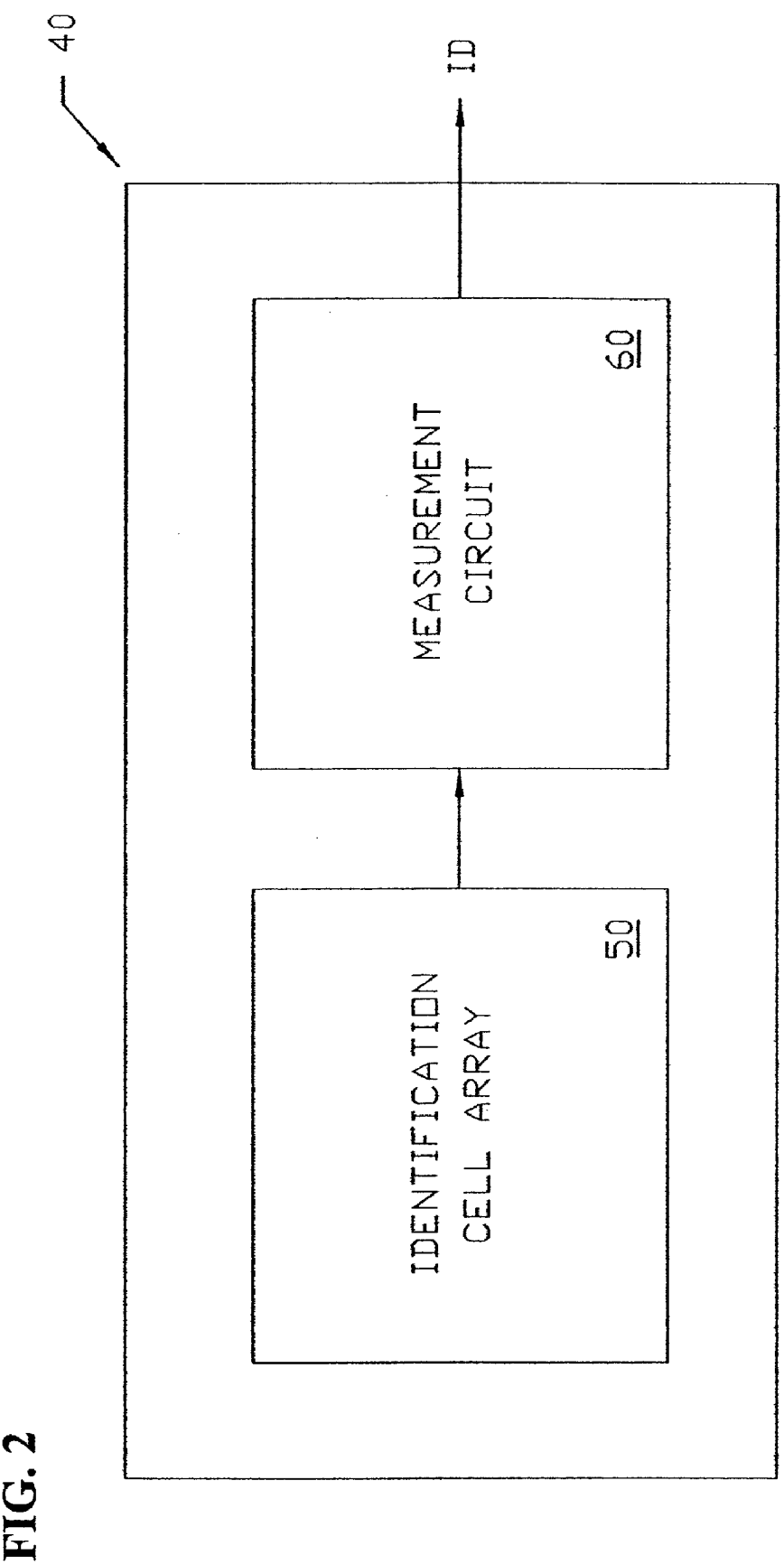
FIG. 2 shows the device of FIG. 1 in more detailed block diagram form.

FIG. 2 illustrates the circuit 40 of FIG. 1 in more detailed block diagram form. The circuit 40 includes an identification cell array 50 and a measurement circuit 60 and outputs an identification ID. As each selected cell of the array 50 receives a control input, timing signals can be sent to the measurement circuit 60 telling it when to measure a parameter of the respective cell. The measurement circuit 60 produces a serial output ID having a value that is base on the particular pattern of measured parameter or differences for all cells of array 50.

Figure 3:
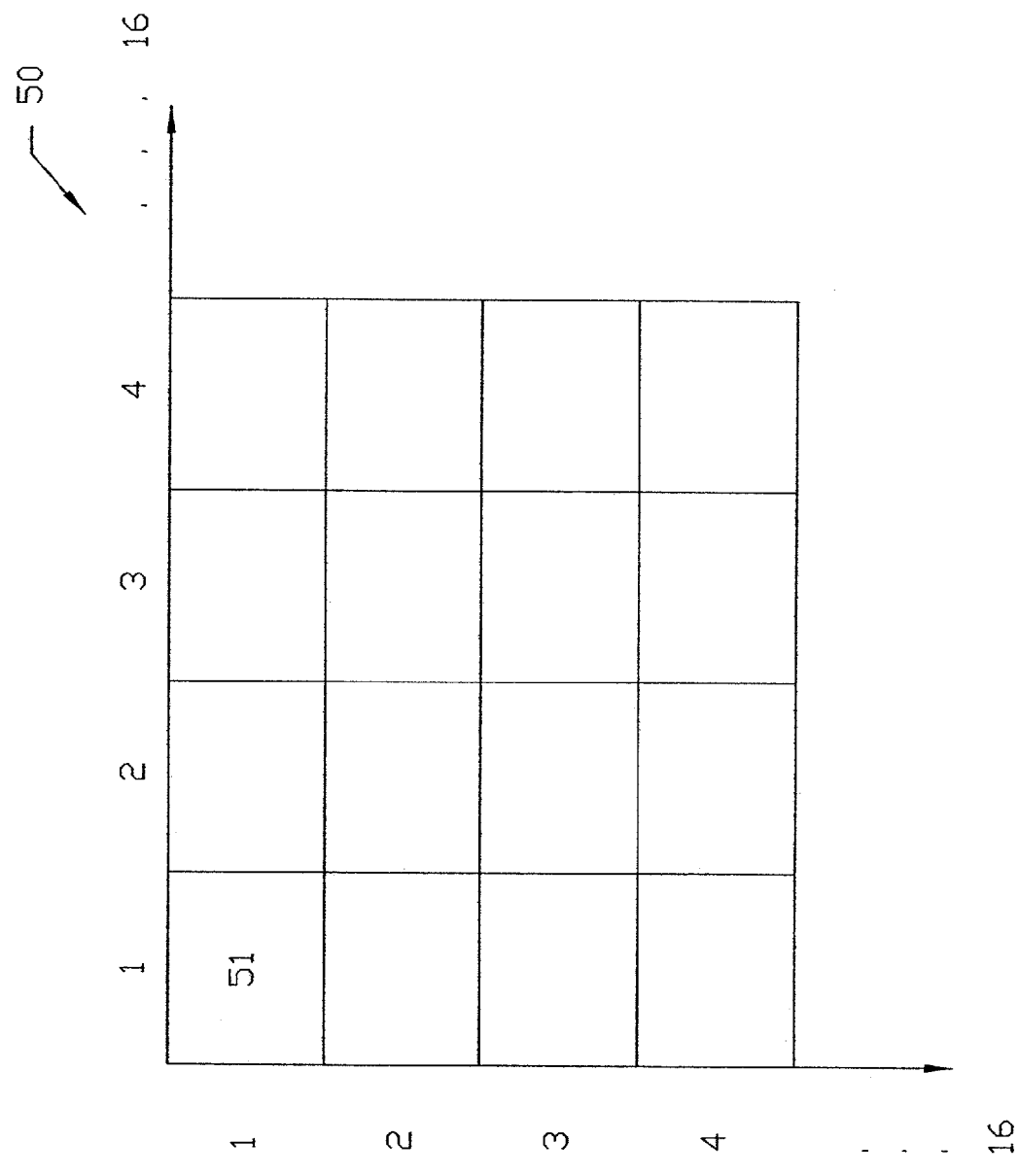
FIG. 3 shows the array of identification cells of FIG. 2 in more detailed block diagram form.

FIG. 3 illustrates the array 50 of FIG. 2 and shows rows and columns of cells 51 forming a cell array. Each cell of array 50 has one or more devices which will be described in detail below. Due to differences or variations in the devices in each cell 51, which result from random parametric variations, values or parameters measured in or on the devices will not exactly match. The difference between the values or parameters will vary from cell to cell. Although the number of cells 51 that should be included in array 50 is largely a function of the number of ICs to be uniquely identified, when circuit 40 of FIG. 2 is to be employed in several million ICs, a large array (i.e., 16×16) of the type shown in FIG. 3 should be used to provide the needed ID resolution.

Figure 4:
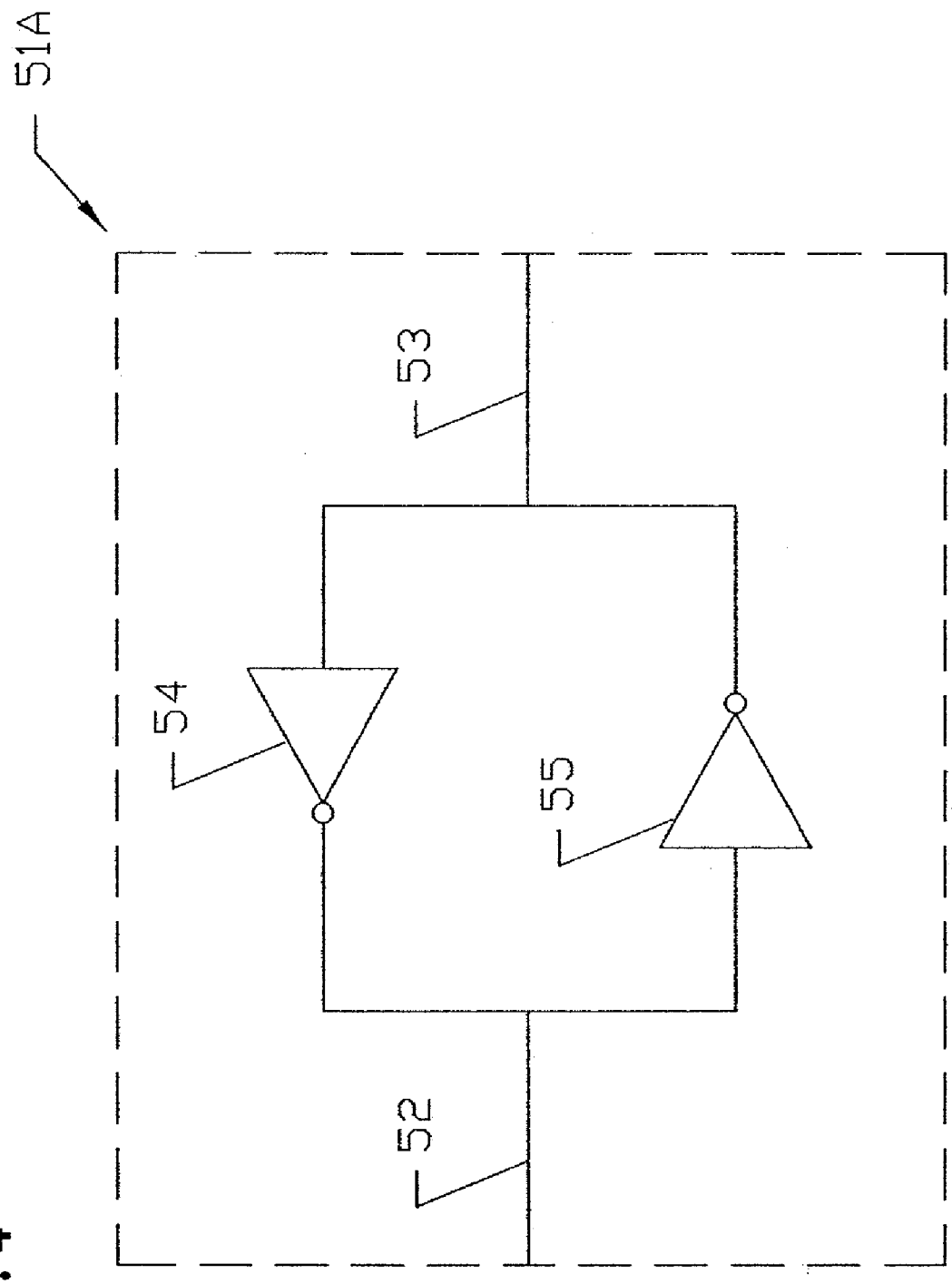
FIG. 4 is a schematic diagram illustrating one non-limiting embodiment of a type of identification cell that can be used in the array of FIG. 3.

FIG. 4 illustrates an embodiment of a typical cell 51A of array 50 in schematic diagram form. In this embodiment, each cell 51A contains a pair of inverters in the form of a first inverter 54 and a second inverter 55. An ECID bit is input via input 52. Due to the inherent or random variation in the inverters 54 and 55, the ECID bit which is output at output 53 will be either a zero ("0") or a one ("1"). On power-up, i.e., when the chip or IC 10 is powered-up, each cell 51A will generate an ECID bit at output 53 based on the differences between inverters 54 and 55. The value at output 53 for each cell 51A in the array is measured and/or obtained by the measurement circuit. A resulting ECID is thus generated based on the values from the cells 51A.

Figure 5:
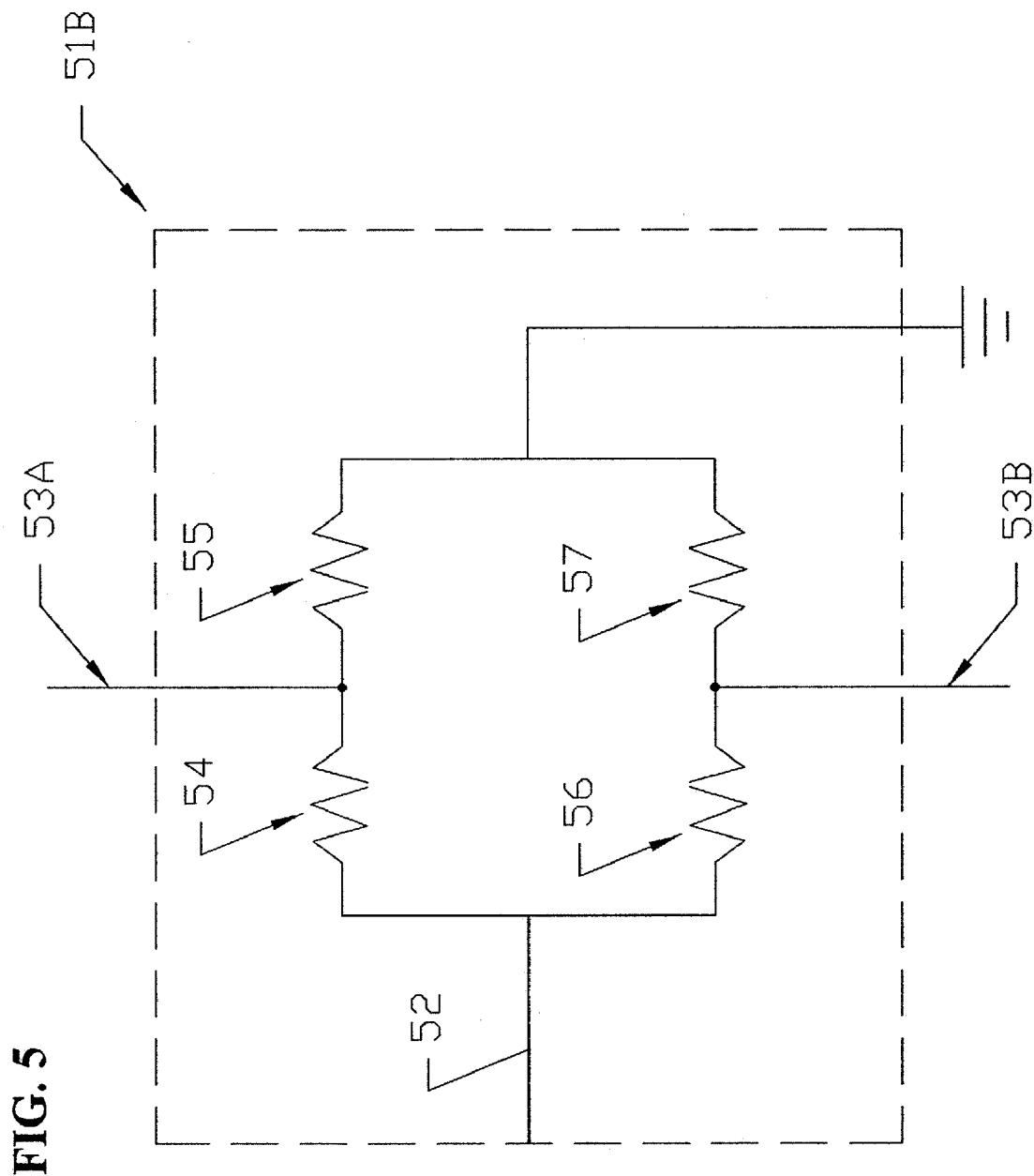
FIG. 5 is a schematic diagram illustrating another non-limiting embodiment of a type of identification cell that can be used in the array of FIG. 3.

FIG. 5 illustrates another embodiment of a typical cell 51B of array 50 in schematic diagram form. In this embodiment, each cell 51B contains four resistors in the form of a first resistor 54, a second resistor 55, a third resistor 56 and a fourth resistor 57. A current is input via input 52. Due to the inherent or random resistance variation in the resistors 54-57, the differences are sensed at locations 53A and 53B which can be used to generate an ECID bit. By way of non-limiting example, a differential amplifier (not shown) can be used to sense voltage differences at locations 53A and 53B. This differential amplifier can be built into the chip or IC 10. When current is supplied to input 52, an ECID bit is generated for each cell by the differential amplifier based on the differences sensed at locations 53A and 53B.

Figure 7:
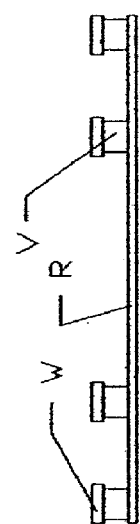
FIGS. 6 and 7 are schematic diagrams illustrating another non-limiting embodiment of a type of identification cell that can be used in the array of FIG. 3.
Figure 6:
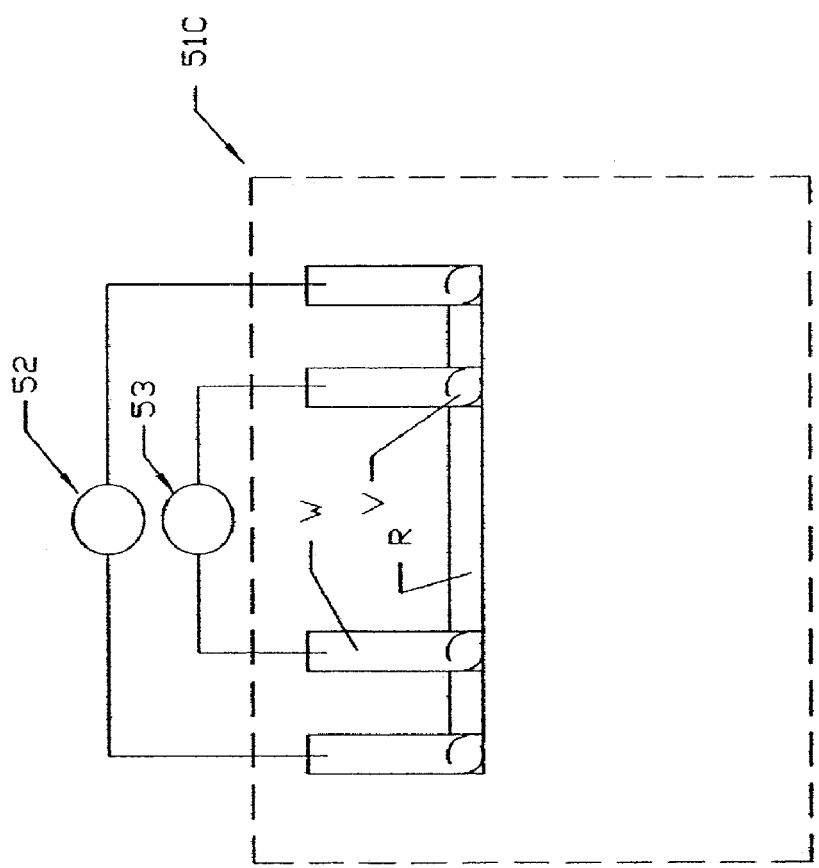

FIGS. 6 and 7 illustrate another embodiment of a typical cell 51C of array 50 in schematic diagram form. In this embodiment, each cell 51C contain a single resistor in the form of a thin film resistor that includes a resistor strip R, four wires W and four vias V. A drive current is input via input 52 to the two outer wires W. A voltage is measured at the two inner wires W. A resistance is then derived based on the voltage at location 53. The derived resistance is then used to generate an ECID bit. When current is supplied to input 52, an ECID bit is generated for each cell using the derived resistance at location 53.

Figure 8:
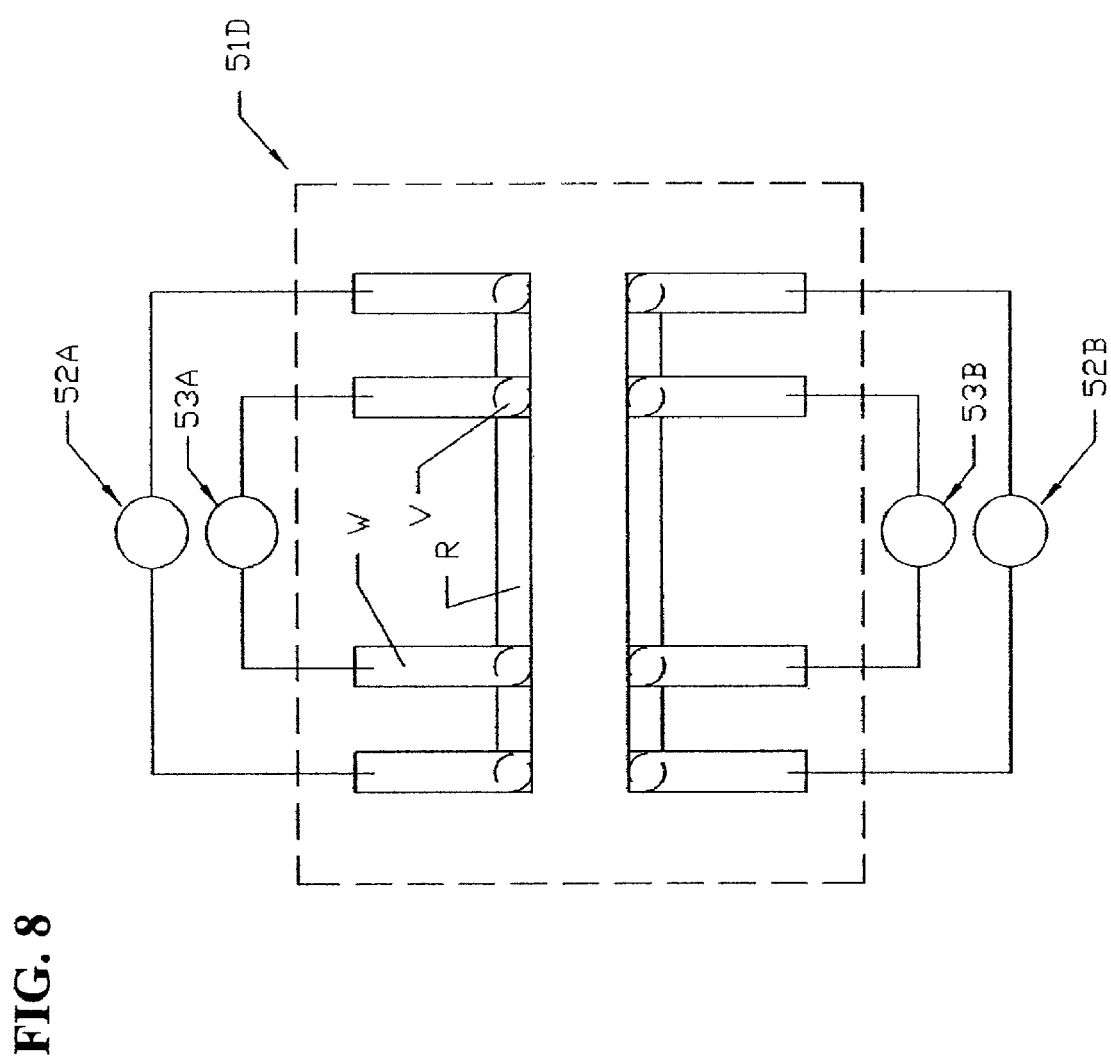
FIG. 8 is a schematic diagram illustrating another non-limiting embodiment of a type of identification cell that can be used in the array of FIG. 3.

FIG. 8 illustrates another embodiment of a typical cell 51D of array 50 in schematic diagram form. In this embodiment, each cell 51C contains two resistors in the form of thin film resistors that each include a resistor strip R, four wires W and four vias V. A drive current is input via inputs 52A and 52B to the two outer wires W of each resistor. A voltage is measured at the two inner wires W of each resistor. A resistance is then derived based on the voltage differences at locations 53A and 53B. The derived resistance differences is then used to generate an ECID bit. When current is supplied to inputs 52A and 52B, an ECID bit is generated for each cell using the derived resistance differences at locations 53A and 53B.

Figure 9:
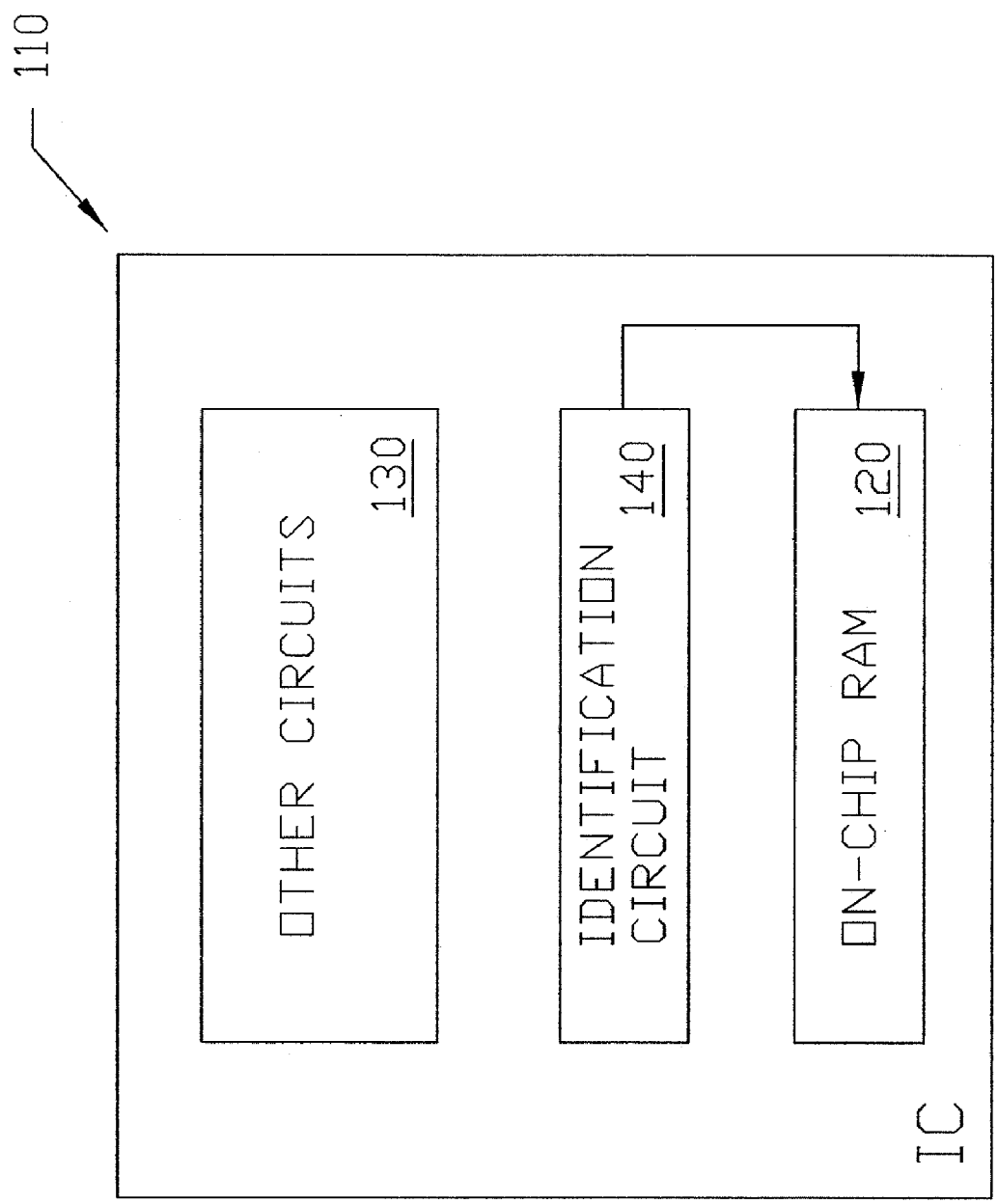
FIG. 9 shows in block diagram form another embodiment of an integrated circuit having arranged therein, among other circuits, a device and/or an identification circuit, and a device for storing the identification of the integrated circuit in accordance with the invention.

FIG. 9 shows another integrated circuit IC or EC 110 which includes, among other things, a plurality of circuits 130 and an identification circuit 140. In this embodiment, the IC 110 also includes an on-chip random access memory (RAM) or non-volatile memory 120. This memory 120 can serve as the location from which the ECID is stored and/or read for the IC or EC 110. In embodiments, the identification circuit 140 outputs a unique identification (ID) which identifies the IC 110 in the same manner as the identification circuit 40 discussed above. The identification circuit 140 is preferably designed as an integral port of the IC 110. In response to control and timing data arriving via control inputs of the identification circuit 140, for example, identification circuit 140 can generate an output data sequence (i.e., an ID) at an IC output terminal (not shown) that uniquely identifies IC chip 110. This ID is stored on the memory 120 and directly on the EC 110.

Figure 10:
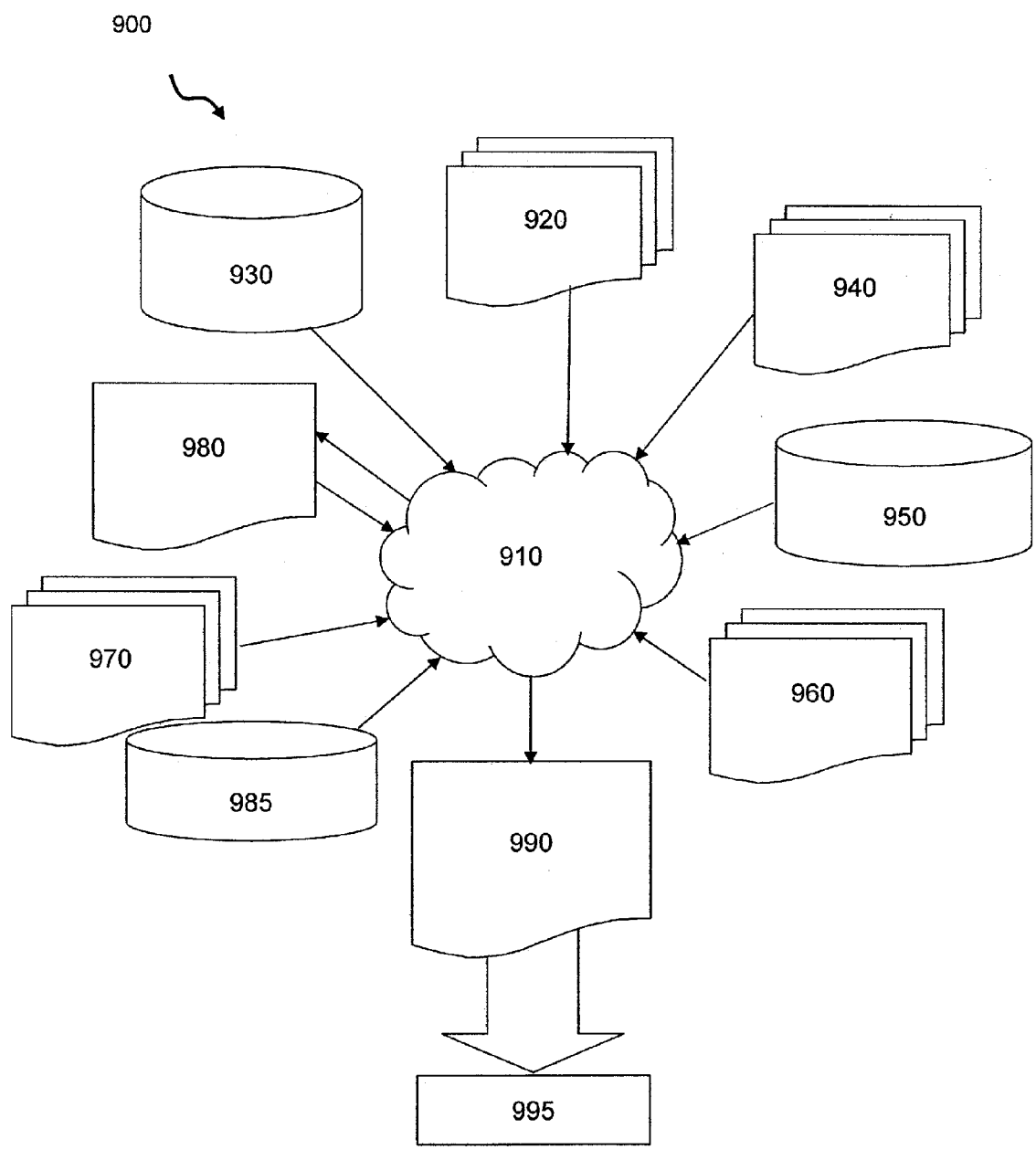
FIG. 10 is a flow diagram of a design process used in semiconductor design, manufacture, and/or test.

FIG. 10 shows a block diagram of an exemplary design flow 900 used for example, in semiconductor IC logic design, simulation, test, layout, and manufacture. Design flow 900 includes processes and mechanisms for processing design structures or devices to generate logically or otherwise functionally equivalent representations of the design structures and/or devices described above and shown in FIGS. 1-9. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-9. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-9 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-9. In one embodiment, design structure 990 may comprise a compiled, executable HDL simulation model that functionally simulates the devices shown in FIGS. 1-9.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-9. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, where applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A device usable on an integrated circuit (IC) for generating an identification (ID) identifying the IC, the device comprising:
   at least three identification cells, wherein:
      a first identification cell of the at least three identification cells comprises a four wire resistor;
      a second identification cell of the at least three identification cells comprises thin film resistors; and
      a third identification cell of the at least three identification cells comprises an inverter pair; and
   a measurement circuit for measuring a parameter of each of the at least three of identification cells,
   wherein the device generates or produces the ID using the measured parameters.

2. The device of claim 1, wherein the parameter results from measuring random parametric variations of the four wire resistor, the thin film resistors, and the inverter pair in each of the first, second, and third identification cells, respectively.

3. The device of claim 1, wherein the device is an integrated circuit identification device (ICID), the ID is a identification number, and the at least three identification cells comprises a 16×16 cell array.

4. The device of claim 1, wherein one of:
each cell has an output that is a substantial function of random parametric variations in said IC; and
the ID is substantially a function of random parametric variations in the at least three identification cells.

5. The device of claim 1, wherein the measurement circuit monitors an output of each the at least three identification cells and generates the ID in response thereto.

6. The device of claim 1, wherein the ID is stored as an ID record on the IC.

7. The device of claim 1, wherein the four wire resistor comprises two wires receiving a drive current and two wires for measuring voltage.

8. The device of claim 7, wherein the measurement circuit measures voltage at the two wires for measuring voltage and derives a resistance.

9. The device of claim 1, wherein the thin film resistors comprises a pair of thin film resistors.

10. The device of claim 9, wherein the measurement circuit measures voltage and derives a resistance.

11. The device of claim 1, wherein the thin film resistors comprises two four wire resistors.

12. The device of claim 11, wherein each four wire resistor comprises two wires receiving a drive current and two wires for measuring voltage.

13. The device of claim 12, wherein the measurement circuit measures voltage at the two wires for measuring voltage and derives a resistance.

14. The device of claim 1, wherein the inverter pair has random variation.

15. The device of claim 14, wherein each inverter pair generates an ICID bit on power up.

16. The device of claim 14, wherein each inverter pair receives an ICID bit and generates an ICID bit on power up.

17. The device of claim 1, wherein one of:
the at least three identification cells generates the ID on power up; and
the device generates the ID when the IC is initially powered up.

18. A device usable on an integrated circuit (IC) for generating an identification (ID) identifying the IC, the device comprising:
an identification circuit formed on the IC and having a at least three identification cells, wherein:
a first identification cell of the at least three identification cells comprises a four wire resistor;
a second identification cell of the at least three identification cells comprises thin film resistors;
a third identification cell of the at least three identification cells comprises an inverter pair; and
each of the four wire resistor, the thin film resistors, and the inverter pair have random parametric variations; and
a measurement circuit formed on the IC and being utilized to generate or produce the ID based on the random parametric variations of the four wire resistor, the thin film resistors, and the inverter pair arranged in the first identification cell, the second identification cell, and the third identification cell, respectively.

19. A method of providing an integrated circuit (IC) with an identification (ID), the method comprising:
forming a device for generating the identification on the IC, wherein the device comprises:
an identification circuit having an array of at least three identification cells;
a first identification cell of the at least three identification cells comprises one of a four wire resistor and a pair of resistors,
a second identification cell of the at least three identification cells comprises thin film resistors, and
a third identification cell of the at least three identification cells comprises a pair of inverters; and
a measurement circuit utilized in generating or producing the ID based on random parametric variations measured in the at least three identification cells of the array.

20. The device of claim 1, wherein:
the four wire resistor comprises two wires receiving a drive current and two wires for measuring voltage and the measurement circuit measures voltage at the two wires for measuring voltage and derives a resistance of the four wire resistor;
the thin film resistors comprise a pair of thin film resistors and the measurement circuit measures voltage and derives a resistance of the pair of thin film resistors; and
the inverter pair has random variation and the inverter pair receives an ICID bit and generates an ICID bit on power up based on the differences between the pair of inverters.

21. The device of claim 20, wherein the derived resistance of the four wire resistor, the derived resistance of the pair of thin film resistors, and the ICID bit of the pair of inverters are representative of differences in respective values of a parameter associated with each identification cell due to at least a process induced variation caused during formation of the IC, and the device generates or produces the ID using the differences in the values of the parameter.

* * * * *